(12) United States Patent
Babcock et al.

(10) Patent No.: US 10,822,540 B2
(45) Date of Patent: *Nov. 3, 2020

(54) SYSTEMS AND METHODS OF OPTIMIZING Y-GRADE NGL UNCONVENTIONAL RESERVOIR STIMULATION FLUIDS

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US); Kevin G. Watts, Spring, TX (US); Roberta Watts, Smithville, TX (US)

(73) Assignee: Linde Aktiengesellschaft, Munich (DE)

( * ) Notice: Subject to any disclaimer, the term of this patent is extended or adjusted under 35 U.S.C. 154(b) by 462 days.

This patent is subject to a terminal disclaimer.

(21) Appl. No.: 15/680,812

(22) Filed: Aug. 18, 2017

(65) Prior Publication Data

US 2019/0055461 A1 Feb. 21, 2019

(51) Int. Cl.
| | | |
|---|---|---|
| *C09K 8/60* | (2006.01) | |
| *E21B 43/25* | (2006.01) | |
| *C09K 8/90* | (2006.01) | |
| *E21B 43/16* | (2006.01) | |
| *C09K 8/88* | (2006.01) | |

(Continued)

(52) U.S. Cl.
CPC ............... *C09K 8/602* (2013.01); *C09K 8/82* (2013.01); *C09K 8/86* (2013.01); *C09K 8/887* (2013.01); *C09K 8/90* (2013.01); *C09K 8/94* (2013.01); *E21B 43/16* (2013.01); *E21B 43/166* (2013.01); *E21B 43/25* (2013.01); *E21B 43/255* (2013.01); *G01V 99/005* (2013.01); *C09K 2208/10* (2013.01); *C09K 2208/30* (2013.01)

(58) Field of Classification Search
CPC .. C09K 8/602; C09K 8/82; C09K 8/86; E21B 43/16; E21B 43/25; G01V 99/005
USPC .......................................................... 703/10
See application file for complete search history.

(56) References Cited

U.S. PATENT DOCUMENTS 3,035,637 A 5/1962 Allen
3,316,965 A 5/1967 Watanabe
(Continued)

FOREIGN PATENT DOCUMENTS

CN 201885591 U 6/2011
DE 102014010105 A1 1/2016
(Continued)

OTHER PUBLICATIONS

Oz et al. ("Practical Insights and benefits of integrating Technology into Exploration, Appraisal and Development of Unconventional Gas and Liquid Rich Shale Reservoir", SPE 2013, pp. 1-19) (Year: 2013).*

(Continued)

*Primary Examiner* — Iftekhar A Khan
(74) *Attorney, Agent, or Firm* — Patterson + Sheridan, LLP

(57) ABSTRACT

Systems and methods of optimizing stimulation fluids in the form of a hydrocarbon foam, an emulsion based foam, an emulsion, and a gelled stimulation fluid, each comprising Y-Grade NGL, which is an unfractionated hydrocarbon mixture that comprises ethane, propane, butane, isobutane, and pentane plus, wherein the unfractionated hydrocarbon mixture is a byproduct of a condensed and demethanized hydrocarbon stream.

47 Claims, 5 Drawing Sheets

(51) Int. Cl.
  *C09K 8/82* (2006.01)
  *C09K 8/86* (2006.01)
  *C09K 8/94* (2006.01)
  *G01V 99/00* (2009.01)

(56) References Cited

U.S. PATENT DOCUMENTS

| | | | |
|---|---|---|---|
| 3,319,712 A | 5/1967 | O'Brien | |
| 3,368,627 A | 2/1968 | Hurst et al. | |
| 4,490,985 A | 1/1985 | Wells | |
| 4,511,381 A | 4/1985 | Mehra | |
| 4,576,005 A | 3/1986 | Force | |
| 6,230,814 B1 | 5/2001 | Nasr et al. | |
| 7,373,790 B2 | 5/2008 | Clare et al. | |
| 7,527,096 B2 | 5/2009 | Chung et al. | |
| 8,408,289 B2* | 4/2013 | Loree | C09K 8/64 166/90.1 |
| 8,505,332 B1* | 8/2013 | Prim | F25J 3/0247 62/618 |
| 8,844,639 B2* | 9/2014 | Gupta | E21B 43/2408 166/401 |
| 9,488,040 B2 | 11/2016 | Chakrabarty et al. | |
| 9,534,836 B2 | 1/2017 | Dubettier-Grenier et al. | |
| 9,725,644 B2* | 8/2017 | Babcock | E21B 43/164 |
| 10,428,263 B2* | 10/2019 | Babcock | C09K 8/703 |
| 10,570,332 B2* | 2/2020 | Babcock | C09K 8/594 |
| 10,570,715 B2* | 2/2020 | Babcock | C09K 8/584 |
| 2005/0189112 A1* | 9/2005 | Taylor | C09K 8/82 166/278 |
| 2006/0243437 A1 | 11/2006 | Albers et al. | |
| 2006/0289166 A1* | 12/2006 | Stromquist | E21B 43/267 166/305.1 |
| 2007/0000666 A1* | 1/2007 | Vozniak | E21B 43/267 166/308.1 |
| 2007/0187340 A1 | 8/2007 | Oresti et al. | |
| 2008/0087041 A1* | 4/2008 | Denton | F25J 3/0238 62/618 |
| 2010/0032171 A1 | 2/2010 | Bali et al. | |
| 2012/0000660 A1 | 1/2012 | Gatlin et al. | |
| 2012/0037370 A1* | 2/2012 | Johnson | E21B 36/00 166/303 |
| 2012/0047942 A1* | 3/2012 | Kolodziej | B63B 27/24 62/611 |
| 2012/0330553 A1* | 12/2012 | Mollaei | E21B 43/16 702/11 |
| 2013/0168086 A1* | 7/2013 | Roberts | E21B 43/267 166/250.01 |
| 2013/0199774 A1* | 8/2013 | Sultenfuss | E21B 43/168 166/248 |
| 2013/0213085 A1 | 8/2013 | Ward | |
| 2013/0220605 A1* | 8/2013 | Vandor | C09K 8/62 166/267 |
| 2013/0228330 A1* | 9/2013 | Loree | E21B 43/34 166/267 |
| 2013/0299167 A1 | 11/2013 | Fordyce et al. | |
| 2014/0000899 A1* | 1/2014 | Nevison | E21B 43/26 166/308.1 |
| 2014/0124208 A1 | 5/2014 | Loree et al. | |
| 2014/0174747 A1 | 6/2014 | Kelly | |
| 2014/0345862 A1* | 11/2014 | Jerauld | E21B 43/16 166/275 |
| 2014/0366577 A1* | 12/2014 | Zubrin | F25J 3/0233 62/619 |
| 2015/0021022 A1 | 1/2015 | Ladva et al. | |
| 2015/0060075 A1* | 3/2015 | Blom | E21B 43/168 166/307 |
| 2015/0152318 A1 | 6/2015 | Travis | |
| 2015/0167550 A1* | 6/2015 | Vandervort | F02C 6/00 60/780 |
| 2015/0184932 A1* | 7/2015 | Higginbotham | E21B 43/164 62/620 |
| 2015/0204170 A1* | 7/2015 | Ayan | E21B 47/00 166/250.01 |
| 2015/0233222 A1* | 8/2015 | Teklu | E21B 43/166 166/305.1 |
| 2015/0251035 A1* | 9/2015 | Martin | C08G 63/688 169/46 |
| 2015/0368566 A1 | 12/2015 | Young et al. | |
| 2016/0069171 A1* | 3/2016 | Stancliffe | E21B 43/2401 166/254.1 |
| 2016/0122628 A1* | 5/2016 | Babcock | C09K 8/92 166/305.1 |
| 2016/0238313 A1* | 8/2016 | Shotts | C10L 3/12 |
| 2016/0280607 A1 | 9/2016 | Land et al. | |
| 2017/0044425 A1* | 2/2017 | Barati Ghahfarokhi | E21B 43/166 |
| 2017/0218742 A1* | 8/2017 | Babcock | B01D 19/0068 |
| 2017/0218743 A1 | 8/2017 | Babcock et al. | |
| 2017/0275520 A1 | 9/2017 | Babcock et al. | |
| 2017/0275521 A1* | 9/2017 | Babcock | E21B 43/26 |
| 2017/0275526 A1* | 9/2017 | Babcock | E21B 37/00 |
| 2017/0292057 A1* | 10/2017 | Babcock | C09K 8/94 |
| 2017/0292059 A1 | 10/2017 | Babcock et al. | |
| 2017/0292354 A1* | 10/2017 | Babcock | E21B 43/16 |
| 2017/0298268 A1 | 10/2017 | Babcock et al. | |
| 2019/0055819 A1* | 2/2019 | Rao | E21B 43/267 |

FOREIGN PATENT DOCUMENTS

| | | |
|---|---|---|
| FR | 2466606 A1 | 4/1981 |
| GB | 2219818 A | 12/1989 |
| WO | 98/04807 A1 | 2/1998 |
| WO | 2010025540 A1 | 3/2010 |
| WO | 2012097424 A1 | 7/2012 |
| WO | 2015020654 A1 | 2/2015 |
| WO | 2015030908 A2 | 3/2015 |
| WO | 2016064645 A1 | 4/2016 |

OTHER PUBLICATIONS

Brahim et al. ("Optimisation of the Energy Efficiency and the CO2 Reduction, for the NGL Separation"IEEE, 2016, pp. 1-5) (Year: 2016).*
PCT International Search Report dated Oct. 22, 2018 for Application No. PCT/US2018/042920.
Australian Examination Report dated Oct. 4, 2017, corresponding to Application No. 2015336280.
Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_ 4159.pdf, pp. 1,5; table 2, Jan. 1, 1992.
Holtz et al., "Summary Integrated Geologic and Engineering Determination of Oil-Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.
International Invitation to Pay Additional Fees dated Feb. 13, 2017, corresponding to Application No. PCT/US2016/063132.
International Invitation to Pay Additional Fees dated Apr. 10, 2017, corresponding to Application No. PCT/US2017/012561.
International Search Report and Written Opinion dated Jan. 8, 2016, corresponding to Application No. PCT/US2015/055627.
International Search Report and Written Opinion dated Feb. 7, 2017, corresponding to Application No. PCT/US2016/063140.
International Search Report and Written Opinion dated Feb. 7, 2017, corresponding to Application No. PCT/US2016/063148.
International Search Report and Written Opinion dated Mar. 29, 2017, corresponding to Application No. PCT/US2016/067454.
International Search Report and Written Opinion dated Mar. 30, 2017, corresponding to Application No. PCT/US2016/067458.
International Search Report and Written Opinion dated Apr. 4, 2017, corresponding to Application No. PCT/US2017/012566.
International Search Report and Written Opinion dated May 10, 2017, corresponding to Application No. PCT/US2016/063127.
International Search Report and Written Opinino dated May 10, 2017, corresponding to Application No. PCT/US2016/063132.

(56) References Cited

OTHER PUBLICATIONS

International Search Report and Written Opinion dated Jun. 7, 2017, corresponding to Application No. PCT/US2017/012561.
International Search Report and Written Opinion dated Sep. 21, 2017, corresponding to Application No. PCT/US2017/014696.
International Search Report and Written Opinion dated Nov. 7, 2017, corresponding to Application No. PCT/US2017/019619.
M. Asadi et al., "Water-Free Fracturing: A Case History", Society of Petroleum Engineers, SPE-175988-MS, 14 Pages.
Nakashima et al., "SPE-177801-MS Development of a Giant Carbonate Oil Field, Part 2: Mitigration from Pressure Maintenance Developement to Sweep Oriented IOR Development", https:/lwww.onepetro.org/download/conference-~aper/SPE-177801-MS?id=conference-paper/SPE-177801-MS, pp. 1-8 and 12-16, Jan. 1, 2015.
Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.
Qing Sun et al., "Quantification of uncertainity in recovery efficiency predictions: lessons learned from 250 mature carbonate fields", SPE 84459, pp. 1-15, Jan. 1, 2005.
S.Rassenfoss; "In Search of the Waterless Fracture", JPT, Jun. 30, 2013, pp. 46-54, XP055237780.

\* cited by examiner

SYSTEMS AND METHODS OF OPTIMIZING Y-GRADE NGL UNCONVENTIONAL RESERVOIR STIMULATION FLUIDS

BACKGROUND

Field of the Disclosure

Embodiments of this disclosure generally relate to systems and methods of optimizing Y-Grade NGL stimulation fluids.

Description of the Related Art

Unconventional resource plays are ushering in a new era for oil and gas production. The term "resource play" refers to a relatively large hydrocarbon play located over a broad geographical area. In a resource play, the geological likelihood of encountering a hydrocarbon generation window having a conventional hydrocarbon bearing reservoir, a seal (or other type of trapping mechanism) to contain the hydrocarbons in the reservoir, and an organic rich source rock from which the hydrocarbons are generated is nearly certain. Resource plays have been described as statistical plays in which an operator can expect fairly repeatable results if enough wells are drilled. The term "unconventional" refers to hydrocarbons that have been bypassed by conventional oil and gas recovery techniques because the hydrocarbons were not considered economically feasible to produce as a result of low permeability and associated uneconomical production rates.

Typically, these unconventional resource plays contain hydrocarbons in a reservoir that is not favorable for economical production. Some typical methods for producing hydrocarbons from these types of reservoirs include injection of a gas, water (in liquid or gas phase), or a combination thereof. However, primary hydrocarbon production from these reservoirs has been reported to be as low as 3% of the original-oil-in-place, thereby leaving up to 97% of the hydrocarbons in place when the reservoir is abandoned.

Therefore, there is a need for new and improved enhanced oil recovery techniques that can be applied to unconventional resource reservoirs.

SUMMARY

In one embodiment, a method of optimizing a Y-Grade NGL stimulation fluid comprises gathering geostatic data and reservoir fluid data of a hydrocarbon bearing reservoir; assessing availability of a supply of Y-Grade NGL and a gas; using the reservoir fluid data and data regarding the composition of the Y-Grade NGL and the gas to determine an equation of state; generating a hydrocarbon foam through a foam generation module, wherein the foam generation module includes customizing a surfactant to be mixed with the Y-Grade NGL and the gas to form the hydrocarbon foam, adjusting foam stability of the hydrocarbon foam, customizing the hydrocarbon foam, and determining a foam rheology of the hydrocarbon foam; formulating computational algorithms for the equation of state and the foam rheology; formulating a 3-D unconventional reservoir simulation model as represented by the geostatic data and the computational algorithms to simulate a reservoir stimulation of the unconventional reservoir using the hydrocarbon foam; and running multiple simulations for different hydrocarbon foams generated by the foam generation module to determine which hydrocarbon foam will obtain an optimum fluid recovery.

In one embodiment, a method of optimizing a Y-Grade NGL stimulation fluid comprises gathering geostatic data and reservoir fluid data of a hydrocarbon bearing reservoir; assessing availability of a supply of Y-Grade NGL, a gas, and water; using the reservoir fluid data and data regarding the composition of the Y-Grade NGL, the gas, and the water to determine an equation of state; generating an emulsion based foam through an emulsion based foam generation module, wherein the emulsion based foam generation module includes customizing a surfactant to be mixed with the Y-Grade NGL, the gas, and the water to form the emulsion based foam, adjusting foam stability of the emulsion based foam, customizing the emulsion based foam, and determining an emulsion based foam rheology of the emulsion based foam; formulating computational algorithms for the equation of state and the emulsion based foam rheology; formulating a 3-D unconventional reservoir simulation model as represented by the geostatic data and the computational algorithms to simulate a reservoir stimulation of the unconventional reservoir using the emulsion based foam; and running multiple simulations for different emulsion based foams generated by the emulsion based foam generation module to determine which emulsion based foam will obtain an optimum fluid recovery.

In one embodiment, a method of optimizing a Y-Grade NGL stimulation fluid comprises gathering geostatic data and reservoir fluid data of a hydrocarbon bearing unconventional reservoir; assessing availability of a supply of Y-Grade NGL and water; using the reservoir fluid data and data regarding the composition of the Y-Grade NGL and the water to determine an equation of state; generating an emulsion through an emulsion generation module, wherein the emulsion generation module includes customizing a surfactant to be mixed with the Y-Grade NGL and the water to form the emulsion, adjusting stability of the emulsion, customizing the emulsion, and determining a rheology of the emulsion; formulating computational algorithms for the equation of state and the emulsion rheology; formulating a 3-D unconventional reservoir simulation model as represented by the geostatic data and the computational algorithms to simulate a reservoir stimulation of the unconventional reservoir using the emulsion; and running multiple simulations for different emulsions generated by the emulsion generation module to determine which emulsion will obtain an optimum fluid recovery.

In one embodiment, a method of optimizing a Y-Grade NGL stimulation fluid comprises gathering geostatic data and reservoir fluid data of a hydrocarbon bearing unconventional reservoir; assessing availability of a supply of Y-Grade NGL; using the reservoir fluid data and data regarding the composition of the Y-Grade NGL to determine an equation of state; generating a Y-Grade NGL stimulation fluid through a Y-Grade NGL generation module, wherein the Y-Grade NGL generation module includes customizing the Y-Grade NGL to form the Y-Grade NGL stimulation fluid and determining a Y-Grade NGL rheology of the Y-Grade NGL stimulation fluid; formulating computational algorithms for the equation of state and the Y-Grade NGL rheology; formulating a 3-D unconventional reservoir simulation model as represented by the geostatic data and the computational algorithms to simulate a reservoir stimulation of the unconventional reservoir using the Y-Grade NGL stimulation fluid; and running multiple simulations for different compositions of Y-Grade NGL stimulation fluids generated by the Y-Grade NGL generation module to determine which Y-Grade NGL stimulation fluid will obtain an optimum fluid recovery.

BRIEF DESCRIPTION OF THE DRAWINGS

So that the manner in which the above recited features can be understood in detail, a more particular description of the embodiments briefly summarized above may be had by reference to the embodiments below, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
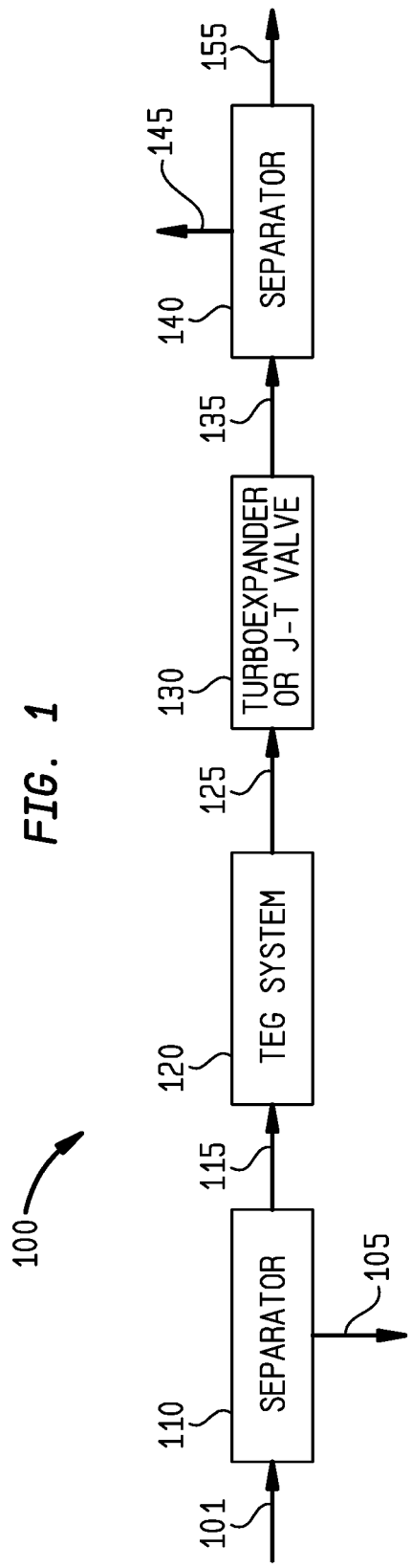
FIG. 1 is a schematic view of a system for obtaining Y-Grade NGL according to one embodiment.

Y-Grade natural gas liquids (referred to herein as Y-Grade NGL) is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of condensed and de-methanized hydrocarbon streams that are produced from shale wells for example and transported to a centralized facility. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent by volume, to allow the Y-Grade NGL to be transported as a liquid in low pressure storage vessels. According to another example, Y-Grade NGL may be processed to have a high ethane content, such as an ethane content within a range of 38-60 percent by volume, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture is sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane; 15-45%, such as 20-35%, for example 27%, propane; 5-10%, for example 7%, normal butane; 5-40%, such as 10-25%, for example 10%, isobutane; and 5-25%, such as 10-20%, for example 13%, pentane plus. Methane is typically less than 1%, such as less than 0.5% by liquid volume.

In one embodiment, Y-Grade NGL comprises condensed, dehydrated, desulfurized, and demethanized natural gas stream components that have a vapor pressure of not more than about 600 psig at 100 degrees Fahrenheit, with aromatics below about 1 weight percent, and olefins below about 1 percent by liquid volume. Materials and streams useful for the embodiments described herein typically include hydrocarbons with melting points below about 0 degrees Fahrenheit.

In one embodiment, Y-Grade NGL may be mixed with a chemical agent. The chemical agent may be mixed with a solubilizing fluid to liquefy any dry chemicals to aid in mixing with the Y-Grade NGL. The solubilizing fluid may comprise fractionated or refined hydrocarbons, such as C3, C4, C5, C6, C7, C8, C9, and mixtures thereof. The solubilizing fluid may comprise C3+ hydrocarbons, including propane, butane, pentane, naphtha, toluene, diesel, natural gasoline, and any combination thereof.

FIG. 1 is a schematic view of a system 100 for obtaining Y-Grade NGL, according to one embodiment, for use with embodiments described herein. The system 100 includes a first separator 110, a triethylene glycol ("TEG") system 120, a turboexpander 130 (or alternatively a Joule-Thompson valve), and a second separator 140. A hydrocarbon stream 101, such as a wet natural gas stream, flows into the first separator 110 where it is separated into a liquid stream 105 and a gas stream 115. The liquid stream 105 comprises liquid hydrocarbons and water. The gas stream 115 flows into the TEG system 120 where water vapor is removed to dehydrate the gas stream 115. The TEG system 120 dehydrates the gas stream 115 that is discharged from the first separator 110 to a water dew point up to −100 degrees Fahrenheit. The gas stream 125 exiting the TEG system 120 flows into the turboexpander 130 (or alternatively the Joule-Thompson valve), which cools the gas stream 125 to a temperature at or below 0 degrees Fahrenheit, for example to a temperature between 0 degrees Fahrenheit and −100 degrees Fahrenheit, for example about −30 degrees Fahrenheit.

The gas stream 125 is cooled to a temperature at or below 0 degrees Fahrenheit to condense out Y-Grade NGL from the remaining gas stream, which is primarily methane. The cooled fluids 135 flow into the second separator 140 where the gas stream 145, which is primarily methane, is separated out from the Y-Grade NGL 155. As a result, the Y-Grade NGL 155 is a byproduct of the condensed and de-methanized hydrocarbon stream 101.

In one embodiment, the gas stream 145 may also comprise ethane in an amount of about 1 percent to about 50 percent by volume. The amount of ethane separated out with the methane can be controlled by the pressure maintained in the second separator 140. The pressure in the second separator 140 may be about 600 psi or less. As the pressure is lowered in the second separator 140, the ethane content of the gas stream 145 is increased, and the ethane content of the Y-Grade NGL 155 is decreased. The Y-Grade NGL 155 may be used to form any of the stimulation fluids and/or with any of the systems and methods described herein.

According to one example, Y-Grade NGL comprises about 43% ethane, about 27% propane, about 7% normal butane, about 10% isobutane, and about 13% pentane plus at a maximum vapor pressure of about 600 psig at 100 degrees Fahrenheit per American Society for Testing and Materials (ASTM) according to the standard testing procedure D-6378 with methane, aromatics, and olefin maximums of 0.5% L.V. % per GPA 2177, 1.0 wt % of total stream per GPA 2186 and 1.0 L.V. % per GPA 2186, respectively.

According to one example, Y-Grade NGL comprises about 28% ethane, about 42% propane, about 13% normal butane, about 7% isobutane, and about 10% pentane plus. According to one example, Y-Grade NGL comprises about 48% ethane, about 31% propane, about 9% normal butane, about 5% isobutane, and about 7% pentane plus. According to one example, Y-Grade NGL comprises about 37%-43% ethane, about 22%-23% propane, about 7% normal butane, about 9%-11% isobutane, and about 13%-16% pentane plus. According to one example, Y-Grade NGL comprises about 10%-20% of at least one hydrocarbon compound having five carbon elements ($C_5$) or more.

Y-Grade NGL may comprise one or more combinations, as a whole or in part, of the Y-Grade NGL examples and/or embodiments described herein.

Figure 2:
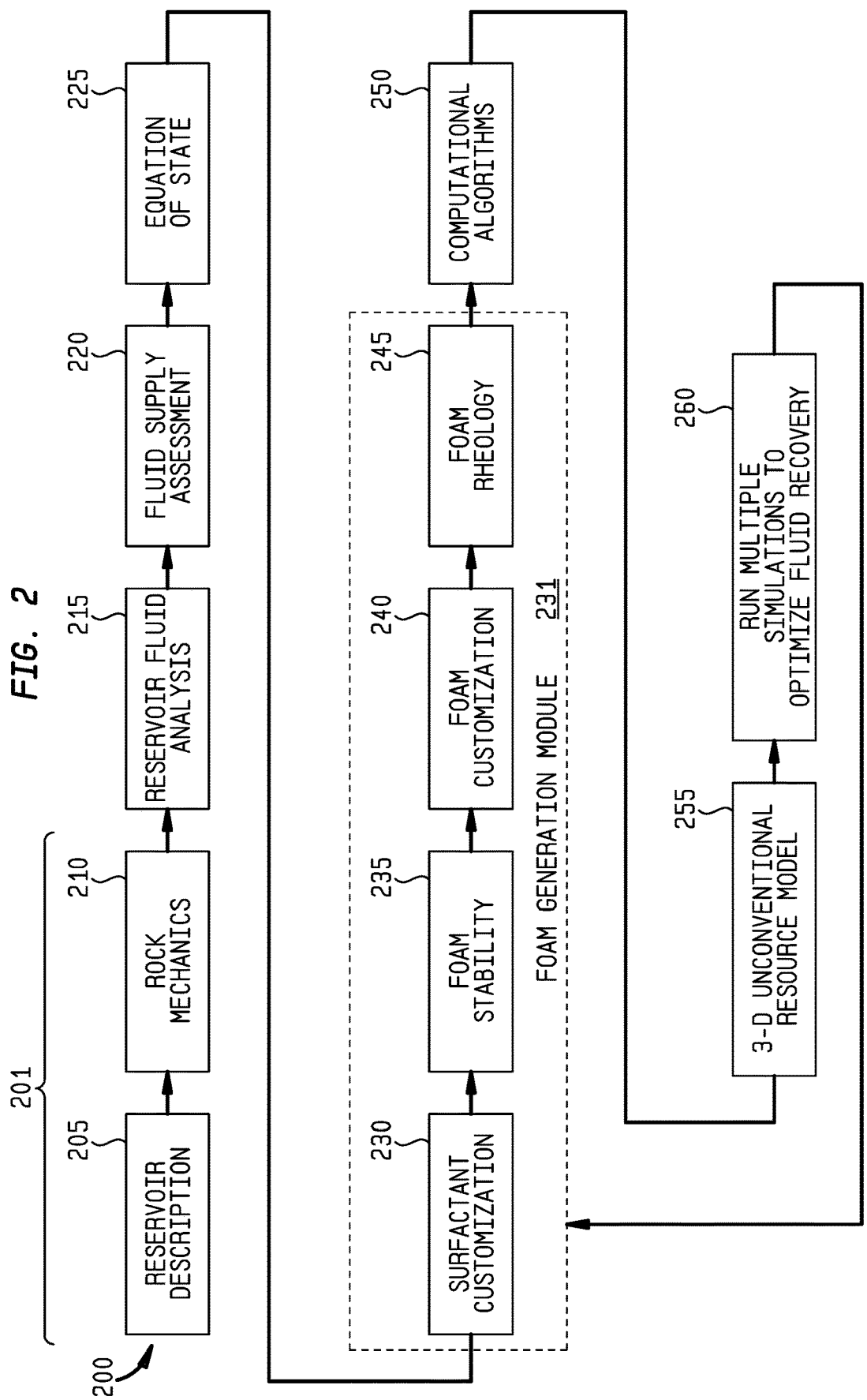
FIG. 2 is a schematic view of a method for optimizing hydrocarbon foam based Y-Grade NGL stimulation fluids according to one embodiment.

FIG. 2 is a schematic view of a method 200 for optimizing hydrocarbon foam based Y-Grade NGL stimulation fluids according to one embodiment.

The method 200 includes a step of gathering geostatic data 201 of a subsurface formation, such as a hydrocarbon bearing unconventional reservoir. Gathering the geostatic data 201 includes obtaining a description of the unconventional reservoir 205, including but not limited to data regarding porosity, permeability, fluid saturations, well location, thickness, depth, pressures, historical production and pressures, and/or temperatures of the unconventional reservoir. Gathering the geostatic data 201 also includes conducting an analysis of the rock mechanical properties 210, including but not limited to data regarding Young's-modulus of elasticity and/or Poisson's ratio of the rock in the unconventional reservoir. The method 200 further includes a step of conducting a reservoir fluid analysis 215 to gather data regarding the reservoir fluid properties, including but not limited to composition, viscosity, density, gas/oil ratio, and/or water/oil ratio of the fluids in the unconventional reservoir.

The method 200 further includes a step of assessing the availability of a supply of fluids 220 needed to create the hydrocarbon foam based Y-Grade NGL stimulation fluids. To create hydrocarbon foam, the supply of fluids 220 will comprise Y-Grade NGL and a gas. The gas that can be used to form the hydrocarbon foam may comprise at least one of nitrogen, carbon dioxide, natural gas, methane, LNG, and ethane. An assessment is made to determine the quantity and/or composition of the Y-Grade NGL and/or the gas that is available for forming the hydrocarbon foam based Y-Grade NGL stimulation fluids.

The method 200 further includes a step of determining an equation of state 225 based on the reservoir fluid analysis 215 and the assessment of the supply of fluids 220. The equation of state 225 may be based on the reservoir fluid data and the quantity and/or composition of the Y-Grade NGL and/or the gas.

The method 200 further includes a step of generating a hydrocarbon foam through a foam generation module 231. The foam generation module 231 includes a step of customizing a surfactant 230 to be mixed with the Y-Grade NGL and the gas to form the hydrocarbon foam, a step of adjusting foam stability 235 of the hydrocarbon foam, a step of customizing the hydrocarbon foam 240, and a step of determining a foam rheology 245 of the hydrocarbon foam.

The step of customizing the surfactant 230 may include selecting a surfactant that is preferentially or selectively soluble in light hydrocarbons. Customizing the surfactant 230 may also include adjusting the molecular weight of the surfactant. Customizing the surfactant 230 may also include selecting at least one of a siloxane surfactant, a fluorosurfactant, a fatty acid ester, a glyceride, a silicon emulsifier, and a hydrophobic silica powder as the surfactant. The surfactant 230 may also be customized by adjusting the concentration of surfactant by up to 5% by weight of the liquid phase of the hydrocarbon foam.

The step of customizing the surfactant 230 may include selecting an anionic surfactant as the surfactant, wherein the anionic surfactant comprises at least one of 2-Acrylamido-2-methylpropane sulfonic acid, ammonium lauryl sulfate, ammonium perfluorononanoate, docusate, magnesium laureth sulfate, MBAS assay, perfluorobutanesulfonic acid, perfluorononanoic acid, perfluorooctanesulfonic acid, perfluorooctanoic acid, phospholipid, potassium lauryl sulfate, soap, soap substitute, sodium alkyl sulfate, sodium dodecyl sulfate, sodium dodecylbenzenesulfonate, sodium laurate, sodium laureth sulfate, sodium lauroyl sarcosinate, sodium myreth sulfate, sodium nonanoyloxybenzenesulfonate, sodium pareth sulfate, sodium stearate, and sulfolipid.

The step of adjusting foam stability 235 includes several ways of adjusting the stability of the foam. The stability of the foam may be adjusted by adjusting foam quality based on the amount of gas, such as nitrogen, that is used to form the hydrocarbon foam. The stability of the foam may be adjusted by adding nanoparticles to reduce fluid loss of the liquid phase of the hydrocarbon foam. The stability of the foam may be adjusted by adding a hydrocarbon soluble co-polymer to viscosify the liquid phase of the hydrocarbon foam. The stability of the foam may be adjusted by changing the type of gas used to form the hydrocarbon foam.

The step of adjusting foam stability 235 may also include adjusting the apparent viscosity of the foam. The apparent viscosity of the foam may be adjusted by adjusting foam quality based on the amount of gas, such as nitrogen, that is used to form the hydrocarbon foam. The apparent viscosity of the foam may be adjusted by adding a hydrocarbon soluble co-polymer to viscosify the liquid phase of the hydrocarbon foam. The apparent viscosity of the foam may be adjusted by adding a secondary fluid comprising up to 10% of the liquid phase of the hydrocarbon foam. The secondary fluid may comprise at least one of aromatics, alkanes, and crude oil.

The step of customizing the foam 240 includes adding a secondary fluid to the hydrocarbon foam, such as to control the mobility of the hydrocarbon foam in the reservoir. The secondary fluid may comprise at least one of aromatics, alkanes, and crude oil. Aromatics may comprise at least one of benzene, naphtha, xylene, toluene, fuel oils, olefins, and diesel. Alkanes may comprise at least one of heptane, octane, and hexane. Crude oil may comprise at least one of NGL's, condensate, light oil, and medium oil.

The step of determining foam rheology 245 includes determining the rheology of the hydrocarbon foam. The foam rheology 245 may be defined by, including but not limited to, its apparent viscosity, density, wettability, relative permeability of the hydrocarbon foam, and saturation of the hydrocarbon foam as a function of temperature, pressure, and composition of the hydrocarbon foam.

After the hydrocarbon foam is generated by the foam generation module 231 and the foam rheology 245 is determined, the method 200 further includes a step of formulating computational algorithms 250 for the equation of state 225 and the foam rheology 245. The method 200 further includes a step of formulating a 3-D unconventional reservoir simulation model 255. The 3-D unconventional reservoir simulation model 255 is formulated by incorporating the geostatic data 201, calibrating the 3-D unconventional reservoir simulation model 255 by history matching with historical production and pressure data, and modifying the 3-D unconventional reservoir simulation model 255 by incorporating the computational algorithms 250 to simulate a stimulation process of the unconventional reservoir using the hydrocarbon foam. The simulation will provide data regarding how the hydrocarbon foam is transported to the unconventional reservoir and how the hydrocarbon foam stimulates the unconventional reservoir.

After the simulation is run in the 3-D unconventional reservoir simulation model 255, the method 200 further includes a step of running multiple simulations 260 by generating different types of hydrocarbon foams using the foam generation module 231 to gather enough data from the simulations to determine which hydrocarbon foam will achieve an optimum hydrocarbon recovery in the unconventional reservoir.

Figure 3:
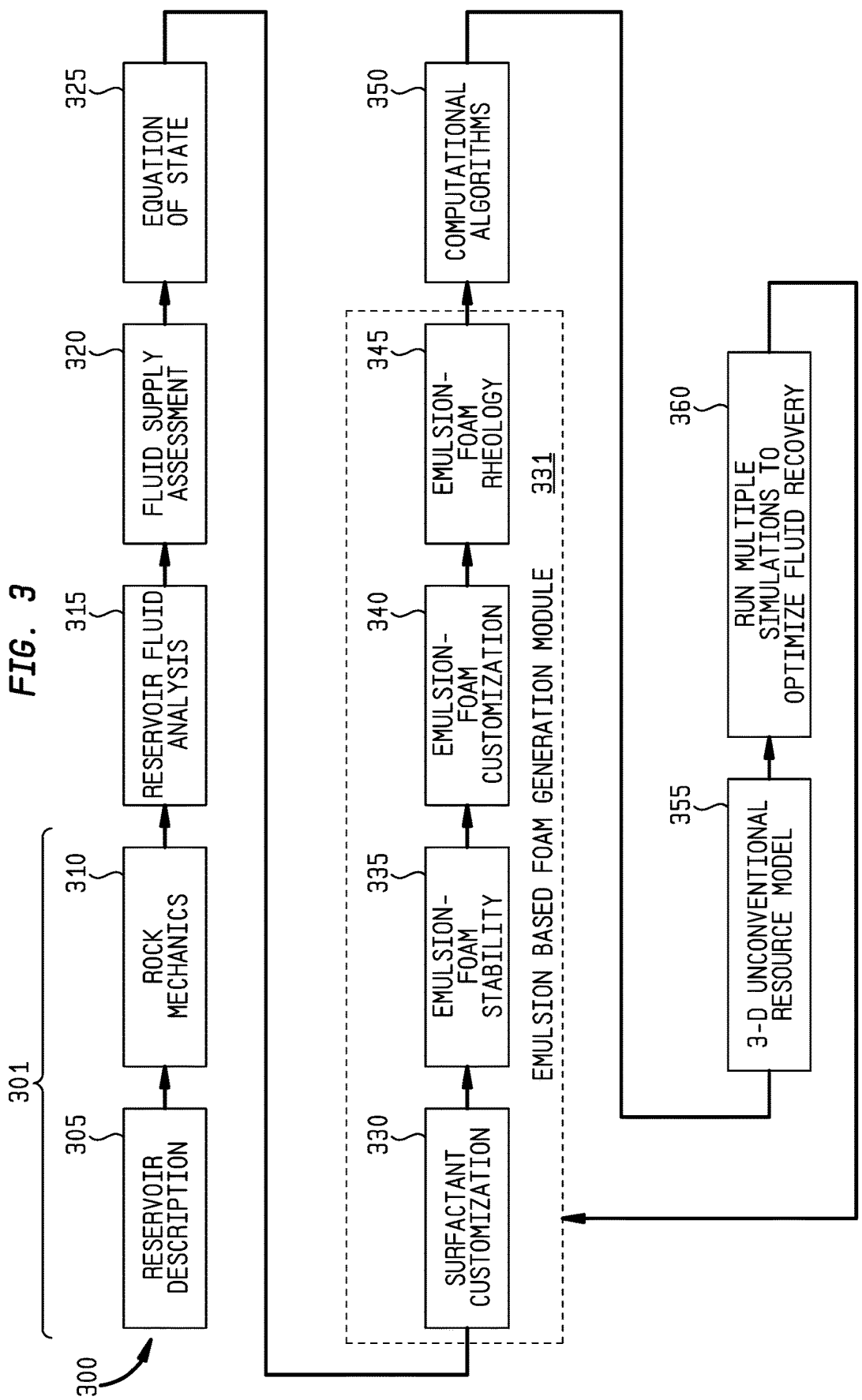
FIG. 3 is a schematic view of a method for optimizing emulsion foam based Y-Grade NGL stimulation fluids according to one embodiment.

FIG. 3 is a schematic view of a method 300 for optimizing emulsion based foam Y-Grade NGL stimulation fluids according to one embodiment.

The method 300 includes the steps of gathering geostatic data 301 of a subsurface formation, such as a hydrocarbon bearing unconventional reservoir, and conducting a reservoir fluid analysis 315 to gather data regarding the reservoir fluid properties, similar to the steps of gathering geostatic data 201 and conducting a reservoir fluid analysis 215 in the method 200.

The method 300 further includes a step of assessing the availability of a supply of fluids 320 needed to create the emulsion based foam Y-Grade NGL stimulation fluids. To create the emulsion based foam stimulation fluid, the supply of fluids 320 will comprise Y-Grade NGL, a gas, such as nitrogen, and water. The gas that can be used to form the emulsion based foam may comprise at least one of nitrogen, carbon dioxide, natural gas, methane, LNG, and ethane. The water can be formation water, brine, seawater, or potassium chloride water, either of which comprises up to 10% of the liquid phase of the emulsion based foam. The potassium chloride water may comprise up to 4% potassium chloride. An assessment is made to determine the quantity and/or composition of the Y-Grade NGL, the gas, and/or the water that is available for forming the emulsion based foam Y-Grade NGL stimulation fluids.

The method 300 further includes a step of determining an equation of state 325 based on the reservoir fluid analysis 315 and the assessment of the supply of fluids 320. The equation of state 325 may be based on the reservoir fluid data and the quantity and/or composition of the Y-Grade NGL, the gas, and/or the water.

The method 300 further includes a step of generating an emulsion based foam through an emulsion based foam generation module 331. The emulsion based foam generation module 331 includes one or more of the steps of customizing a surfactant 330 to be mixed with the Y-Grade NGL, the gas, and the water to form the emulsion based foam, adjusting emulsion based foam stability 335 of the emulsion based foam, customizing the emulsion based foam 340, and determining an emulsion based foam rheology 345 of the emulsion based foam.

The step of customizing the surfactant 330 may include selecting a surfactant that is preferentially or selectively soluble in light hydrocarbons, water, or both. For emulsion based foams, the surfactant 330 acts as a foaming agent, an emulsifying agent, or both. Customizing the surfactant 330 may also include adjusting the molecular weight of the surfactant. The surfactant 330 may also be customized by adjusting the concentration of surfactant by up to 5% by weight of the liquid phase of the emulsion based foam. Customizing the surfactant 330 comprises selecting at least one of a non-ionic surfactant, an anionic surfactant, and a cationic surfactant as the surfactant that is soluble in light hydrocarbons, water, or both.

The non-ionic surfactant comprises at least one of a siloxane, a fluorosurfactant, a fatty acid ester, a glyceride, a silicon emulsifier, and a hydrophobic silica powder.

The anionic surfactant comprises at least one of 2-Acrylamido-2-methylpropane sulfonic acid, ammonium lauryl sulfate, ammonium perfluorononanoate, docusate, magnesium laureth sulfate, MBAS assay, perfluorobutanesulfonic acid, perfluorononanoic acid, perfluorooctanesulfonic acid, perfluorooctanoic acid, phospholipid, potassium lauryl sulfate, soap, soap substitute, sodium alkyl sulfate, sodium dodecyl sulfate, sodium dodecylbenzenesulfonate, sodium laurate, sodium laureth sulfate, sodium lauroyl sarcosinate, sodium myreth sulfate, sodium nonanoyloxybenzenesulfonate, sodium pareth sulfate, sodium stearate, and sulfolipid.

The cationic surfactant comprises at least one of behentrimonium chloride, benzalkonium chloride, benzethonium chloride, bronidox, cetrimonium bromide, cetrimonium chloride, dimethyldioctadecylammonium bromide, dimethyldioctadecylammonium chloride, lauryl methyl gluceth-10 hydroxypropyl dimonium chloride, octenidine dihydrochloride, olaflur, N-Oleyl-1,3-propanediamine, stearalkonium chloride, tetramethylammonium hydroxide, and thonzonium bromide.

The step of adjusting emulsion based foam stability 335 includes several ways of adjusting the stability of the emulsion based foam. The stability of the emulsion based foam can be adjusted by adjusting foam quality based on the amount of gas, such as nitrogen, that is used to form the emulsion based foam. The stability of the emulsion based foam can be adjusted by adding nanoparticles to reduce fluid loss of the liquid phase of the emulsion based foam. The stability of the emulsion based foam can be adjusted by adding a hydrocarbon soluble co-polymer to viscosify the liquid phase of the emulsion based foam. The stability of the emulsion based foam can be adjusted by changing the type of gas used to form the emulsion based foam. The emulsion based foam stability may be adjusted by adding a water soluble co-polymer to viscosify the liquid phase of the emulsion based foam.

The step of adjusting emulsion based foam stability 335 may also include adjusting the apparent viscosity of the emulsion based foam. The apparent viscosity of the emulsion based foam may be adjusted by adjusting foam quality based on the amount of gas, such as nitrogen, that is used to form the emulsion based foam. The apparent viscosity of the foam may be adjusted by adding a hydrocarbon soluble co-polymer to viscosify the liquid phase of the emulsion based foam. The apparent viscosity of the emulsion based foam may be adjusted by adding a secondary fluid comprising up to 10% of the liquid phase of the emulsion based foam. The secondary fluid may comprise at least one of aromatics, alkanes, and crude oil. The apparent viscosity of the emulsion based foam may be adjusted by adding a water soluble co-polymer to viscosify the liquid phase of the emulsion based foam.

The step of customizing the emulsion based foam 340 includes adding a secondary fluid to the emulsion based foam. The secondary fluid may comprise at least one of aromatics, alkanes, and crude oil. Aromatics may comprise at least one of benzene, naphtha, xylene, toluene, fuel oils, olefins, and diesel. Alkanes may comprise at least one of heptane, octane, and hexane. Crude oil may comprise at least one of NGL's, condensate, light oil, and medium oil.

The step of determining emulsion based foam rheology 345 includes determining the rheology of the emulsion based foam. The emulsion based foam rheology 345 may be defined by, including but not limited to, its apparent viscosity, density, wettability, relative permeability of the emulsion based foam, and saturation of the emulsion based foam as a function of temperature, pressure, and composition of the emulsion based foam.

After the emulsion based foam is generated by the emulsion based foam generation module 331 and the emulsion based foam rheology 345 is determined, the method 300 further includes a step of formulating computational algorithms 350 for the equation of state 325 and the emulsion based foam rheology 345. The method 300 further includes a step of formulating a 3-D unconventional reservoir simulation model 355. The 3-D unconventional reservoir simulation model 355 is formulated by incorporating the geostatic data 301, calibrating the 3-D unconventional reservoir simulation model 355 by history matching with historical production and pressure data, and modifying the 3-D unconventional reservoir simulation model 355 by incorporating the computational algorithms 350 to simulate a stimulation process of the unconventional reservoir using the emulsion based foam. The simulation will provide data regarding how the emulsion based foam is transported to the unconventional reservoir and how the emulsion based foam stimulates the unconventional reservoir.

After the simulation is run in the 3-D unconventional reservoir simulation model 355, the method 300 further includes a step of running multiple simulations 360 by generating different types of emulsion based foams using the emulsion based foam generation module 331 to gather enough data from the simulations to determine which emulsion based foam will achieve an optimum hydrocarbon recovery in the unconventional reservoir.

Figure 4:
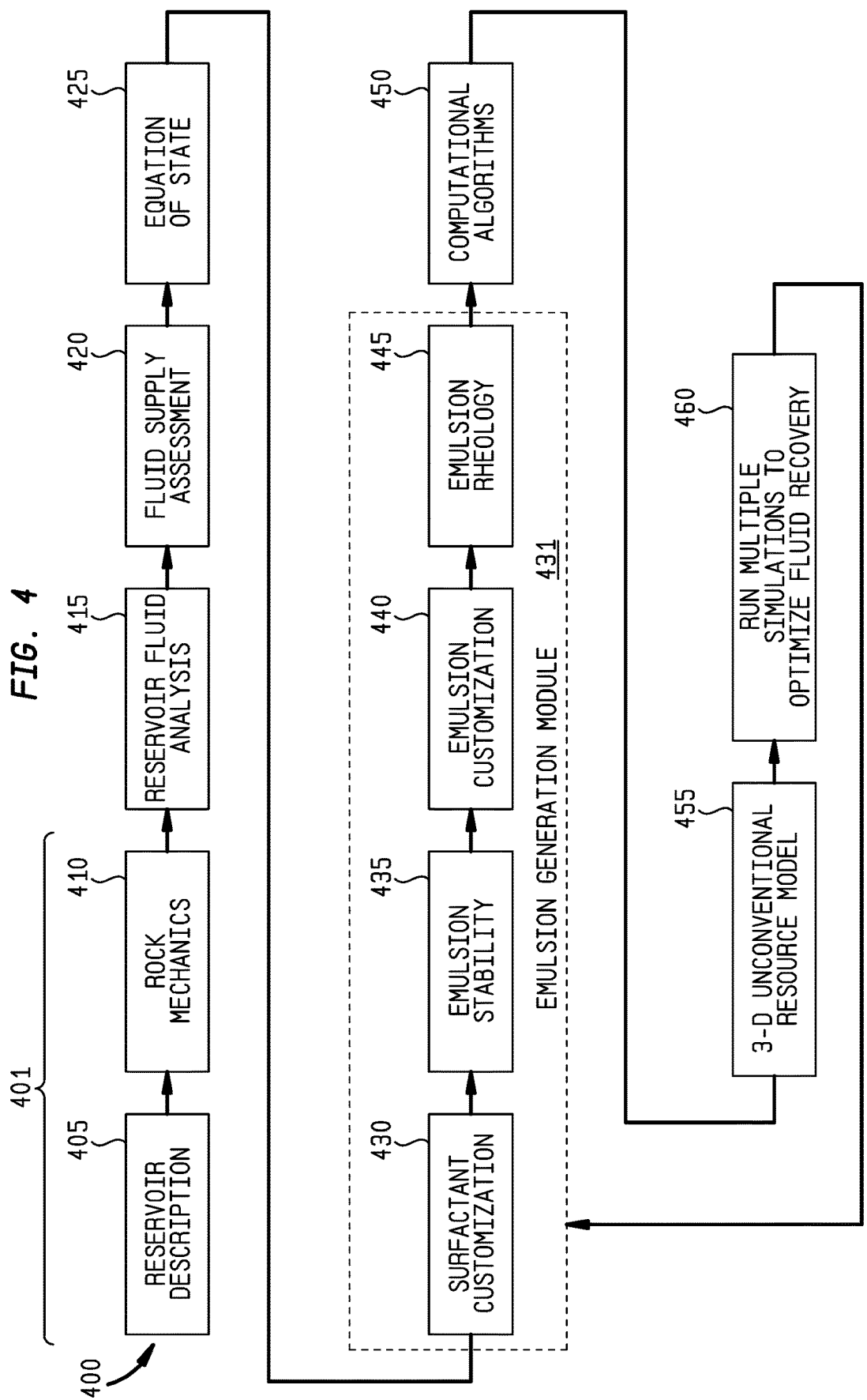
FIG. 4 is a schematic view of a method for optimizing emulsion based Y-Grade NGL stimulation fluids according to one embodiment.

FIG. 4 is a schematic view of a method 400 for optimizing emulsion based Y-Grade NGL stimulation fluids according to one embodiment.

The method 400 includes the steps of gathering geostatic data 401 of a subsurface formation, such as a hydrocarbon bearing unconventional reservoir, and conducting a reservoir fluid analysis 415 to gather data regarding the reservoir fluid properties, similar to the steps of gathering geostatic data 201 and conducting a reservoir fluid analysis 215 in the method 200.

The method 400 further includes a step of assessing the availability of a supply of fluids 420 needed to create the emulsion based Y-Grade NGL stimulation fluids. To create an emulsion, the fluids 420 will comprise Y-Grade NGL and water. The water can be formation water, brine, seawater, or potassium chloride water, either of which comprises up to 10% of the liquid phase of the emulsion. The potassium chloride water may comprise up to 4% potassium chloride. An assessment is made to determine the quantity and/or composition of the Y-Grade NGL and/or the water that is available for forming the emulsion based Y-Grade NGL stimulation fluids.

The method 400 further includes a step of determining an equation of state 425 based on the reservoir fluid analysis 415 and the assessment of the supply of fluids 420. The equation of state 425 may be based on the reservoir fluid data and the quantity and/or composition of the Y-Grade NGL and/or the water.

The method 400 further includes a step of generating an emulsion through an emulsion generation module 431. The emulsion generation module 431 includes one or more of the steps of customizing a surfactant 430 to be mixed with the Y-Grade NGL and the water to form the emulsion, adjusting emulsion stability 435 of the emulsion, customizing the emulsion 440, and determining an emulsion rheology 445 of the emulsion.

The step of customizing the surfactant 430 may include selecting a surfactant that is preferentially or selectively soluble in light hydrocarbons, water, or both. For emulsions, the surfactant 430 acts as an emulsifying agent. Customizing the surfactant 430 may also include adjusting the molecular weight of the surfactant. The surfactant 430 may also be customized by adjusting the concentration of surfactant by up to 5% by weight of the emulsion. Customizing the surfactant 430 may also include selecting at least one of a non-ionic surfactant, an anionic surfactant, and a cationic surfactant as the surfactant that is soluble in light hydrocarbons, water, or both.

The non-ionic surfactant comprises at least one of a siloxane, a fluorosurfactant, a fatty acid ester, a glyceride, a silicon emulsifier, and a hydrophobic silica powder.

The anionic surfactant comprises at least one of 2-Acrylamido-2-methylpropane sulfonic acid, ammonium lauryl sulfate, ammonium perfluorononanoate, docusate, magnesium laureth sulfate, MBAS assay, perfluorobutanesulfonic acid, perfluorononanoic acid, perfluorooctanesulfonic acid, perfluorooctanoic acid, phospholipid, potassium lauryl sulfate, soap, soap substitute, sodium alkyl sulfate, sodium dodecyl sulfate, sodium dodecylbenzenesulfonate, sodium laurate, sodium laureth sulfate, sodium lauroyl sarcosinate, sodium myreth sulfate, sodium nonanoyloxybenzenesulfonate, sodium pareth sulfate, sodium stearate, and sulfolipid.

The cationic surfactant comprises at least one of behentrimonium chloride, benzalkonium chloride, benzethonium chloride, bronidox, cetrimonium bromide, cetrimonium chloride, dimethyldioctadecylammonium bromide, dimethyldioctadecylammonium chloride, lauryl methyl gluceth-10 hydroxypropyl dimonium chloride, octenidine dihydrochloride, olaflur, N-Oleyl-1,3-propanediamine, stearalkonium chloride, tetramethylammonium hydroxide, and thonzonium bromide.

The step of adjusting emulsion stability 435 includes several ways of adjusting the stability of the emulsion. The stability of the emulsion may be adjusted by changing the percent volume of water used to form the emulsion. The stability of the emulsion may be adjusted by adding a viscosifier to the emulsion. The viscosifier may comprise at least one of a hydrocarbon soluble co-polymer and a water soluble viscosifier. The water soluble viscosifer may comprise at least one of water soluble co-polymers, polysaccarides, guar gum, viscoelastic surfactants, crosslinkers, cellulosic viscosifiers, and hydroxyethyl cellulose.

The step of adjusting emulsion stability 435 may also include adjusting the apparent viscosity of the emulsion. The apparent viscosity of the emulsion may be adjusted by adding a hydrocarbon soluble or water soluble co-polymer to viscosify the liquid phase of the emulsion. The apparent viscosity of the emulsion may be adjusted by changing the percent volume of water used to form the emulsion. The apparent viscosity of the emulsion may be adjusted by adding a secondary fluid comprising up to 10% of the liquid phase of the emulsion. The secondary fluid may comprise at least one of aromatics, alkanes, and crude oil.

The step of customizing the emulsion 440 includes adding a secondary fluid to the emulsion. The secondary fluid may comprise at least one of aromatics, alkanes, and crude oil. Aromatics may comprise at least one of benzene, naphtha, xylene, toluene, fuel oils, olefins, and diesel. Alkanes may comprise at least one of heptane, octane, and hexane. Crude oil may comprise at least one of NGL's, condensate, light oil, and medium oil.

The step of determining emulsion rheology 445 includes determining the rheology of the emulsion. The emulsion rheology 445 may be defined by, including but not limited to, its apparent viscosity, density, wettability, relative permeability of the emulsion, and saturation of the emulsion as a function of temperature, pressure, and composition of the emulsion.

After the emulsion is generated by the emulsion generation module 431 and the emulsion rheology 445 is determined, the method 400 further includes a step of formulating computational algorithms 450 for the equation of state 425 and the emulsion rheology 445. The method 400 further includes a step of formulating a 3-D unconventional reservoir simulation model 455. The 3-D unconventional reservoir simulation model 455 is formulated by incorporating the geostatic data 401, calibrating the 3-D unconventional reservoir simulation model 455 by history matching with historical production and pressure data, and modifying the 3-D unconventional reservoir simulation model 455 by incorporating the computational algorithms 450 to simulate a stimulation process of the unconventional reservoir using the emulsion. The simulation will provide data regarding how the emulsion is transported to the unconventional reservoir and how the emulsion stimulates the reservoir.

After the simulation is run in the 3-D unconventional reservoir simulation model 455, the method 400 further includes a step running multiple simulations 460 of different types of emulsions generated by the emulsion generation module 431 to gather enough data from the simulations to determine which emulsion will achieve an optimum hydrocarbon recovery in the unconventional reservoir.

Figure 5:
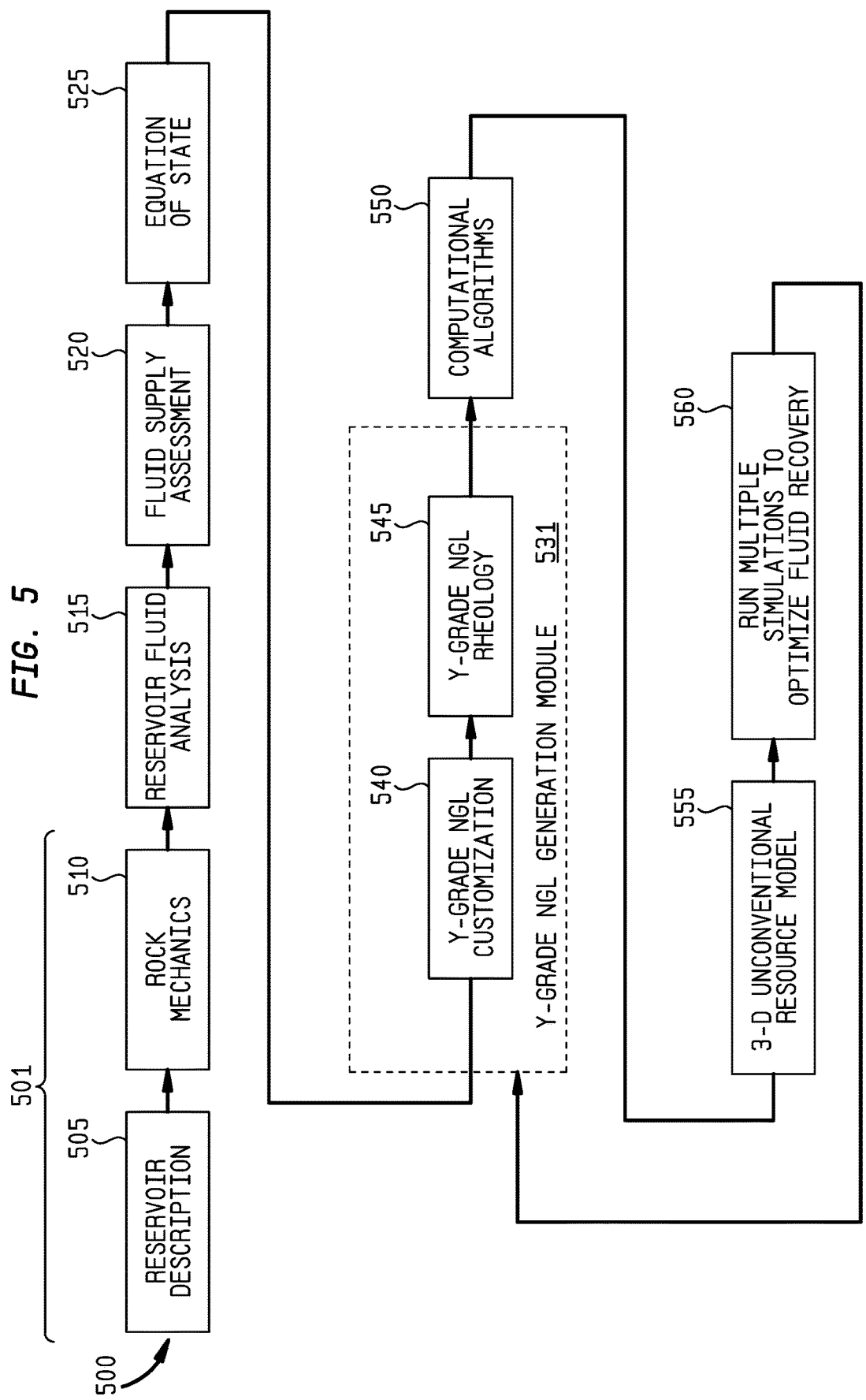
FIG. 5 is a schematic view of a method for optimizing Y-Grade NGL stimulation fluids according to one embodiment.

FIG. 5 is a schematic view of a method 500 for optimizing Y-Grade NGL stimulation fluids according to one embodiment.

The method 500 includes the steps of gathering geostatic data 501 of a subsurface formation, such as a hydrocarbon bearing unconventional reservoir, and conducting a reservoir fluid analysis 515 to gather data regarding the reservoir fluid properties, similar to the steps of gathering geostatic data 201 and conducting a reservoir fluid analysis 215 in the method 200.

The method 500 further includes a step of assessing the availability of a supply of fluids 520 needed to create the Y-Grade NGL stimulation fluids. To create a Y-Grade NGL stimulation fluid, the fluid 520 will comprise Y-Grade NGL. An assessment is made to determine the quantity and/or composition of the Y-Grade NGL that is available for forming the Y-Grade NGL stimulation fluids.

The method 500 further includes a step of determining an equation of state 525 based on the reservoir fluid analysis 515 and the assessment of the supply of fluids 520. The equation of state 525 may be based on the reservoir fluid data and the quantity and/or composition of the Y-Grade NGL.

The method 500 further includes a step of generating a Y-Grade NGL stimulation fluid through a Y-Grade NGL generation module 531. The Y-Grade NGL generation module 531 includes one or more of the steps of customizing the Y-Grade NGL 540 to form the stimulation fluid and determining a Y-Grade NGL rheology 545 of the stimulation fluid.

The step of customizing the Y-Grade NGL 540 may include adjusting the composition of the Y-Grade NGL to form the Y-Grade NGL stimulation fluid.

The step of determining Y-Grade NGL rheology 545 includes determining the rheology of the stimulation fluid. The Y-Grade NGL rheology 545 may be defined by, including but not limited to, its apparent viscosity, density, wettability, relative permeability of the Y-Grade NGL, and saturation of the Y-Grade NGL as a function of temperature, pressure, and composition of the Y-Grade NGL.

After the Y-Grade NGL stimulation fluid is generated by the Y-Grade NGL generation module 531 and the Y-Grade NGL rheology 545 is determined, the method 500 further includes a step of formulating computational algorithms 550 for the equation of state 525 and the Y-Grade NGL rheology 545. The method 500 further includes a step of formulating a 3-D unconventional reservoir simulation model 555. The 3-D unconventional reservoir simulation model 555 is formulated by incorporating the geostatic data 501, calibrating the 3-D unconventional reservoir simulation model 555 by history matching with historical production and pressure data, and modifying the 3-D unconventional reservoir simulation model 555 by incorporating the computational algorithms 550 to simulate a stimulation process of the unconventional reservoir using the Y-Grade NGL stimulation fluid. The simulation will provide data regarding how the Y-Grade NGL stimulation fluid is transported to the unconventional reservoir and how the Y-Grade NGL stimulation fluid stimulates the reservoir.

After the simulation is run in the 3-D unconventional reservoir simulation model 555, the method 500 further includes a step running multiple simulations 560 of different compositions of Y-Grade NGL stimulation fluids generated by the Y-Grade NGL generation module 531 to gather enough data from the simulations to determine which Y-Grade NGL stimulation fluid will achieve an optimum hydrocarbon recovery in the unconventional reservoir.

The stimulation fluids, such as the hydrocarbon foam, the emulsion based foam, the emulsion, and the Y-Grade NGL stimulation fluids, disclosed herein may comprise non-aqueous based chemical agents. The non-aqueous based chemical agents include but are not limited to non-aqueous based foaming agents, foam stabilizers, emulsifying agents, gelling agents, viscosity increasing agents, surfactants, nanoparticles, and combinations thereof.

The stimulation fluids, such as the emulsion based foam and the emulsion, disclosed herein may comprise aqueous based chemical agents. The aqueous based chemical agents include but are not limited to aqueous based foaming agents, foam stabilizers, emulsifying agents, gelling agents, viscosity increasing agents, surfactants, nanoparticles, breakers, friction reducers, scale inhibiters, bio-cides, acids, buffer/pH adjusting agents, clay stabilizers, corrosion inhibiters, cross-linkers, iron controls, solvents, and combinations thereof.

The stimulation fluids, such as the hydrocarbon foam and the emulsion based foam, disclosed herein may comprise foaming agents. The foaming agents include but are not limited to nonionic surfactants, wherein the nonionic surfactants comprise at least one of a siloxane surfactant, a fluorosurfactant, a fatty acid ester, a glyceride, a silicon emulsifier, a hydrophobic silica powder, and combinations thereof.

The foaming agents may also include but are not limited to surfactants, such as nonionic surfactants, anionic surfactants, cationic surfactants, iC90-glycol, iC10-glycol, 1-propanol, iso-propanol, 2-butanol, butyl glycol, sulfonic acids, betaine compounds, fluorosurfactants, hydrocarbon solvents, aluminum soaps, phosphate esters, alcoholethersulfates, alcohol sulfate, alcylsulfates, isethionates, sarconisates, acylsarcosinates, olefinsulfonates, alcylethercarboxylates, alcylalcoholamides, aminoxids, alkylbenzolsulfonate, alkylnaphthalene sulfonates, fattyalcohol ethoxylates, oxo-alcohol ethoxylates, alkylethoxylates, alkylphenolethoxylates, fattyamin- and fattyamidethoxylates, alkylpolyglucosides, oxoalcohol ethoxylates, guerbetalcohol alkoxylates, betaines, cocamidopropylbetaine, C8-C10 alkylamidopropylbetaine, sulfobetaines, alkenylsulfonates, alkylglykols, alcoholalkoxylates, sulfosuccinates, alkyletherphosphates, esterquats, dialcylammoniumderivatives, trialcylammoniumderivatives, and combinations thereof.

The stimulation fluids, such as the hydrocarbon foam and the emulsion based foam, disclosed herein may comprise foam stabilizers. The foam stabilizers include but are not limited to proteins, microparticles, nanoparticles, silica, and silica derivatives that are known to stabilize foam and emulsions through so-called "pickering". The foam stabilizers may comprise additives that increase the viscosity of the stimulation fluid composing the lamella, such as polymeric structures.

The stimulation fluids, such as the hydrocarbon foam, the emulsion based foam, and the emulsion stimulation fluids, disclosed herein may comprise secondary fluids. The secondary fluids include but are not limited to aromatics, alkanes, crude oils, and combinations thereof. The secondary fluid may comprises 10% or less by volume of the stimulation fluids described herein. The aromatics may comprise at least one of benzene, naphtha, xylene, toluene, fuel oils, olefins, and diesel. The alkanes may comprise at least one of heptane, octane, and hexane. The crude oil may comprise at least one of NGL's, condensate, light oil, and medium oil.

The stimulation fluids disclosed herein may also be customized by adding a diverting agent to the stimulation fluid. For example, the unconventional reservoir may have been previously perforated at one or more locations (forming multiple perforation clusters) along the length of the wellbore that extends through the subsurface formation. The diverting agent is used to temporarily block flow through one or more perforation clusters that are preferentially accepting the stimulation fluid to help introduce fluid flow into one or more other perforation clusters that previously had not accepted the stimulation fluid. The temporary blocking of flow improves the distribution of the stimulation fluid across the entire clusters of perforations. At the conclusion of the stimulation, the diverting agent either dissolves, biodegrades, and/or is removed from the perforation clusters via gravity, pressure surge, hydraulically, mechanically, and/or other displacement means.

The diverting agent may include at least one of a mechanical diverting agent, a chemical diverting agent, and/or a nanoparticle based diverting agent. An example of a mechanical diverting agent includes ball sealers. The diverting agent may be formed out of a biodegradable, fluid sensitive, and/or temperature sensitive material. For example, the diverting agent may be rock salt that solubilizes when exposed to water in the subsurface formation. The diverting agent can be fashioned in any shape that corresponds to the shape of the perforation channel to temporarily plug and divert the stimulation fluid to other perforation channels in the same or different perforation clusters.

The stimulation fluids disclosed herein may comprise an unfractionated hydrocarbon mixture comprising ethane, propane, butane, isobutane, and pentane plus, wherein the ethane, propane, and butane comprise at least 75% by volume of the unfractionated hydrocarbon mixture.

The stimulation fluids disclosed herein may comprise an unfractionated hydrocarbon mixture comprising ethane, propane, butane, isobutane, and pentane plus, wherein the ethane comprises at least 3% by volume of the unfractionated hydrocarbon mixture.

The stimulation fluids may comprise an unfractionated hydrocarbon mixture comprising ethane, propane, butane, isobutane, and pentane plus, wherein the pentane plus comprises less than 30% by volume of the unfractionated hydrocarbon mixture.

The stimulation fluids disclosed herein may be formed with any type of gas, such as carbon dioxide, nitrogen, natural gas, methane, LNG, and/or ethane, and include one or more foaming agents, such as a surfactant, to form a hydrocarbon foam. The gas content of the stimulation fluid may be between about 55% to about 95% by volume. The nitrogen content of a hydrocarbon or emulsion based foam created by any of the systems disclosed herein may be greater than 50% by volume, and the carbon dioxide content of a hydrocarbon or emulsion based foam created by any of the systems disclosed herein may be greater than 35% by volume, which causes the resulting gaseous mixtures to be outside the Flammability Limit, sometimes referred to as the Explosion Limit in which a flammable substance such as Y-Grade NGL in the presence of air can produce a fire or explosion when an ignition source such as a spark or open flame is present.

A method of stimulating a hydrocarbon bearing reservoir comprises mixing Y-Grade NGL, a surfactant, water, and a gas, such as nitrogen, to form an emulsion based foam; and pumping the emulsion based foam into a hydrocarbon bearing unconventional reservoir via a wellhead to stimulate the hydrocarbon bearing unconventional reservoir.

A method of stimulating a hydrocarbon bearing unconventional reservoir comprises mixing Y-Grade NGL, an emulsifying agent, and water to form an emulsion; and pumping the emulsion into a hydrocarbon bearing unconventional reservoir via a wellhead to stimulate the hydrocarbon bearing unconventional reservoir.

A method of stimulating a hydrocarbon bearing reservoir comprises provising Y-Grade NGL to form a Y-Grade NGL stimulation fluid; and pumping the Y-Grade NGL stimulation fluid into a hydrocarbon bearing unconventional reservoir via a wellhead to stimulate the hydrocarbon bearing unconventional reservoir.

A method of stimulating a hydrocarbon bearing reservoir comprises displacing any one of the stimulation fluids described herein with a displacing fluid comprising at least one of nitrogen, carbon dioxide, methane, ethane, LNG, natural gas, water, and gelled or polymer water. The water may be formation water, brine, seawater, or inhibited fresh water. The displacing fluid can be injected as a continuous slug or by alternating slugs of the displacing fluid with the stimulation fluid.

While the foregoing is directed to certain embodiments, other and further embodiments may be devised without departing from the basic scope thereof, and the scope thereof is determined by the claims that follow.

The invention claimed is:

1. A method of optimizing a Y-Grade NGL stimulation fluid, comprising:
    gathering geostatic data and reservoir fluid data of a hydrocarbon bearing unconventional reservoir;
    determining a quantity and composition of a supply of Y-Grade NGL and a gas;
    generating an equation of state based on the reservoir fluid data and data regarding the composition of the supply of Y-Grade NGL and the gas;
    generating a simulated hydrocarbon foam through a foam generation module, wherein the foam generation module is configured to customize a surfactant to be mixed with the Y-Grade NGL and the gas to form the hydrocarbon foam, adjust foam stability of the hydrocarbon foam, select a secondary fluid to add to the hydrocarbon foam, and determine a foam rheology of the hydrocarbon foam;
    simulating an oil recovery process of the hydrocarbon bearing unconventional reservoir using the hydrocarbon foam through a 3-D unconventional reservoir simulation model, wherein the geostatic data, previously matched historical production and pressure data, the equation of state, and the foam rheology are input into the model to simulate the oil recovery process of the hydrocarbon bearing unconventional reservoir using the hydrocarbon foam; and
    running multiple simulations of the oil recovery process of the hydrocarbon bearing unconventional reservoir through the model for different simulated hydrocarbon foams generated by the foam generation module to determine which hydrocarbon foam will obtain an optimum fluid recovery.

2. The method of claim 1, further comprising customizing the surfactant by selecting at least one of a siloxane surfactant, a fluorosurfactant, a fatty acid ester, a glyceride, a silicon emulsifier, and a hydrophobic silica powder as the surfactant.

3. The method of claim 1, further comprising customizing the surfactant by at least one of adjusting the molecular weight of the surfactant, selecting a surfactant that is soluble in light hydrocarbons, and adjusting the concentration of surfactant by up to 5% by weight of the liquid phase of the hydrocarbon foam.

4. The method of claim 1, further comprising adjusting foam stability by performing at least one of the following steps: adjusting foam quality based on the amount of the gas used to form the hydrocarbon foam, adding nanoparticles to reduce fluid loss of the liquid phase of the hydrocarbon foam, adding a hydrocarbon soluble co-polymer to viscosify the liquid phase of the hydrocarbon foam, and changing the type of gas used to form the hydrocarbon foam.

5. The method of claim 1, wherein the secondary fluid comprises at least one of aromatics, alkanes, and crude oil.

6. The method of claim 5, wherein the crude oil comprises at least one of NGL's, condensate, light oil, and medium oil.

7. The method of claim 1, further comprising adjusting foam stability by adjusting foam quality, wherein the foam quality is adjusted by adjusting the amount of gas used to form the hydrocarbon foam.

8. The method of claim 1, further comprising further comprising adjusting foam stability by adjusting apparent viscosity, wherein the apparent viscosity is adjusted by at least one of the following: adjusting foam quality based on the amount of the gas used to form the hydrocarbon foam, adding a hydrocarbon soluble co-polymer to viscosify the liquid phase of the hydrocarbon foam, and adding a secondary fluid comprising up to 10% of the liquid phase of the hydrocarbon foam, wherein the secondary fluid comprises at least one of aromatics, alkanes, and crude oil.

9. The method of claim 1, further comprising determining the foam rheology based on apparent viscosity, density, wettability, relative permeability of the hydrocarbon foam, and saturation of the hydrocarbon foam as a function of temperature, pressure, and composition of the hydrocarbon foam.

10. The method of claim 1, further comprising formulating computational algorithms for the equation of state and the foam rheology for each hydrocarbon foam.

11. The method of claim 1, wherein the gas comprises at least one of nitrogen, carbon dioxide, natural gas, methane, LNG, and ethane.

12. The method of claim 1, further comprising customizing the hydrocarbon foam by adding at least one of a mechanical diverting agent and a chemical diverting agent with the hydrocarbon foam.

13. A method of optimizing a Y-Grade NGL stimulation fluid, comprising:
    gathering geostatic data and reservoir fluid data of a hydrocarbon bearing unconventional reservoir;
    determining a quantity and composition of a supply of Y-Grade NGL, a gas, and water;
    generating an equation of state based on the reservoir fluid data and data regarding the composition of the supply of Y-Grade NGL, the gas, and the water;
    generating a simulated emulsion based foam through an emulsion based foam generation module, wherein the emulsion based foam generation module is configured to customize a surfactant to be mixed with the Y-Grade NGL, the gas, and the water to form the emulsion based foam, adjust foam stability of the emulsion based foam, select a secondary fluid to add to the emulsion based foam, and determine an emulsion based foam rheology of the emulsion based foam;

simulating an oil recovery process of the hydrocarbon bearing unconventional reservoir using the emulsion based foam through a 3-D unconventional reservoir simulation model, wherein the geostatic data, previously matched historical production and pressure data, the equation of state, and the emulsion based foam rheology are input into the model to simulate the oil recovery process of the hydrocarbon bearing unconventional reservoir using the emulsion based foam; and running multiple simulations of the oil recovery process of the hydrocarbon bearing unconventional reservoir through the model for different simulated emulsion based foams generated by the emulsion based foam generation module to determine which emulsion based foam will obtain an optimum fluid recovery.

14. The method of claim 13, wherein the surfactant acts as a foaming agent, an emulsifying agent, or both.

15. The method of claim 13, further comprising customizing the surfactant by at least one of adjusting the molecular weight of the surfactant and adjusting the concentration of surfactant by up to 5% by weight of the liquid phase of the emulsion based foam.

16. The method of claim 13, further comprising customizing the surfactant by selecting at least one of a non-ionic surfactant, an anionic surfactant, and a cationic surfactant as the surfactant, wherein the non-ionic surfactant is soluble in light hydrocarbons, and wherein the anionic surfactant and the cationic surfactants are soluble in water.

17. The method of claim 16, wherein the non-ionic surfactant comprises at least one of a siloxane, a fluorosurfactant, a fatty acid ester, a glyceride, a silicon emulsifier, and a hydrophobic silica powder as the surfactant.

18. The method of claim 13, further comprising adjusting foam stability by performing at least one of the following steps: adjusting foam quality based on the amount of the gas used to form the emulsion based foam, adding nanoparticles to reduce fluid loss of the liquid phase of the emulsion based foam, adding a hydrocarbon soluble co-polymer to viscosify the liquid phase of the emulsion based foam, adding a water soluble co-polymer to viscosify the liquid phase of the emulsion based foam, and changing the type of gas used to form the emulsion based foam.

19. The method of claim 13, wherein the secondary fluid comprises at least one of aromatics, alkanes, and crude oil.

20. The method of claim 19, wherein the crude oil comprises at least one of NGL's, condensate, light oil, and medium oil.

21. The method of claim 13, further comprising adjusting foam stability by adjusting foam quality, wherein the foam quality is adjusted by adjusting the amount of gas used to form the emulsion based foam.

22. The method of claim 13, further comprising further comprising adjusting foam stability by adjusting apparent viscosity, wherein the apparent viscosity is adjusted by at least one of the following: adjusting foam quality based on the amount of the gas used to form the emulsion based foam, adding a hydrocarbon soluble co-polymer to viscosify the liquid phase of the emulsion based foam, adding a water soluble co-polymer to viscosify the liquid phase of the emulsion based foam, and adding a secondary fluid comprising up to 10% of the liquid phase of the emulsion based foam, wherein the secondary fluid comprises at least one of aromatics, alkanes, and crude oil.

23. The method of claim 13, further comprising determining the emulsion based foam rheology based on apparent viscosity, density, wettability, relative permeability of the emulsion based foam, and saturation of the emulsion based foam as a function of temperature, pressure, and composition of the emulsion based foam.

24. The method of claim 13, further comprising formulating computational algorithms for the equation of state and the emulsion based foam rheology for each emulsion based foam.

25. The method of claim 13, wherein the water is formation water, brine, or seawater and comprises up to 10% of the liquid phase of the emulsion based foam.

26. The method of claim 13, wherein the water is potassium chloride water and comprises up to 10% of the liquid phase of the emulsion based foam, wherein the potassium chloride water comprises up to 4% potassium chloride.

27. The method of claim 13, wherein the gas comprises at least one of nitrogen, carbon dioxide, natural gas, methane, LNG, and ethane.

28. The method of claim 13, further comprising customizing the emulsion based foam by adding at least one of a mechanical diverting agent and a chemical diverting agent with the emulsion based foam.

29. A method of optimizing a Y-Grade NGL stimulation fluid, comprising:

gathering geostatic data and reservoir fluid data of a hydrocarbon bearing unconventional reservoir;

determining a quantity and composition of a supply of Y-Grade NGL and water;

generating an equation of state based on the reservoir fluid data and data regarding the composition of the supply of Y-Grade NGL and the water;

generating a simulated emulsion through an emulsion generation module, wherein the emulsion generation module is configured to customize a surfactant to be mixed with the Y-Grade NGL and the water to form the emulsion, adjust stability of the emulsion, customize the emulsion, and determine a rheology of the emulsion;

simulating an oil recovery process of the hydrocarbon bearing unconventional reservoir using the emulsion through a 3-D unconventional reservoir simulation model, wherein the geostatic data, previously matched historical production and pressure data, the equation of state, and the emulsion rheology are input into the model to simulate the oil recovery process of the hydrocarbon bearing unconventional reservoir using the emulsion; and running multiple simulations of the oil recovery process of the hydrocarbon bearing unconventional reservoir through the model for different simulated emulsions generated by the emulsion generation module to determine which emulsion will obtain an optimum fluid recovery.

30. The method of claim 29, further comprising customizing the surfactant by selecting at least one of a siloxane surfactant, a fluorosurfactant, a fatty acid ester, a glyceride, a silicon emulsifier, and a hydrophobic silica powder as the surfactant.

31. The method of claim 29, further comprising customizing the surfactant by at least one of adjusting the molecular weight of the surfactant, selecting a non-ionic surfactant that is selectively soluble in light hydrocarbons, selecting an anionic surfactant that is selectively soluble in water, selecting a cationic surfactant that is selectively soluble in water, and adjusting the concentration of surfactant by up to 5% by weight of the emulsion.

32. The method of claim 29, further comprising customizing the emulsion by changing the percent volume of water used to form the emulsion.

33. The method of claim 29, further comprising customizing the emulsion by adding a secondary fluid to the emulsion, wherein the secondary fluid comprises at least one of aromatics, alkanes, and crude oil.

34. The method of claim 33, wherein the crude oil comprises at least one of NGL's, condensate, light oil, and medium oil.

35. The method of claim 29, further comprising customizing the emulsion by adjusting the apparent viscosity, wherein the apparent viscosity is adjusted by at least one of the following: adding a hydrocarbon soluble co-polymer to viscosify the liquid phase of the emulsion, adding a water soluble co-polymer to viscosify the liquid phase of the emulsion, changing the percent volume of water used to form the emulsion, and adding a secondary fluid comprising up to 10% of the liquid phase of the emulsion, wherein the secondary fluid comprises at least one of aromatics, alkanes, and crude oil.

36. The fluid of claim 29, further comprising customizing the emulsion by adding a viscosifier, wherein the viscosifier comprises at least one of a hydrocarbon soluble co-polymer and a water soluble viscosifier, and wherein the water soluble viscosifier comprises at least one of water soluble co-polymers, polysaccharides, guar gum, viscoelastic surfactants, crosslinkers, cellulosic viscosifiers, and hydroxyethyl cellulose.

37. The method of claim 29, further comprising determining the emulsion rheology based on apparent viscosity, density, wettability, relative permeability of the emulsion, and saturation of the emulsion as a function of temperature, pressure, and composition of the emulsion.

38. The method of claim 29, further comprising formulating computational algorithms for the equation of state and the emulsion rheology for each emulsion.

39. The method of claim 29, further comprising customizing the emulsion by adding at least one of a mechanical diverting agent and a chemical diverting agent with the emulsion.

40. The method of claim 29, wherein the water is formation water, brine or seawater and comprises up to 10% of the liquid phase of the emulsion.

41. The method of claim 29, wherein the water is potassium chloride water and comprises up to 10% of the liquid phase of the emulsion, wherein the potassium chloride water comprises up to 4% potassium chloride.

42. A method of optimizing a Y-Grade NGL stimulation fluid, comprising:
gathering geostatic data and reservoir fluid data of a hydrocarbon bearing unconventional reservoir;
determining a quantity and composition of a supply of Y-Grade NGL;
generating an equation of state based on the reservoir fluid data and data regarding the composition of the supply of Y-Grade NGL;
generating a simulated Y-Grade NGL stimulation fluid through a Y-Grade NGL generation module, wherein the Y-Grade NGL generation module is configured to customize the Y-Grade NGL to form the Y-Grade NGL stimulation fluid and determine a Y-Grade NGL rheology of the Y-Grade NGL stimulation fluid;
simulating an oil recovery process of the hydrocarbon bearing unconventional reservoir using the Y-Grade NGL stimulation fluid through a 3-D unconventional reservoir simulation model, wherein the geostatic data, previously matched historical production and pressure data, the equation of state, and the Y-Grade NGL rheology are input into the model to simulate the oil recovery process of the hydrocarbon bearing unconventional reservoir using the Y-Grade NGL stimulation fluid; and
running multiple simulations of the oil recovery process of the hydrocarbon bearing unconventional reservoir through the model for different simulated compositions of Y-Grade NGL stimulation fluids generated by the Y-Grade NGL generation module to determine which Y-Grade NGL stimulation fluid will obtain an optimum fluid recovery.

43. The method of claim 42, further comprising customizing the Y-Grade NGL stimulation fluid by adjusting the composition of the Y-Grade NGL used to form the Y-Grade NGL stimulation fluid.

44. The method of claim 42, further comprising determining the Y-Grade NGL rheology based on apparent viscosity, density, wettability, relative permeability of the Y-Grade NGL, and saturation of the Y-Grade NGL as a function of temperature, pressure, and composition of the Y-Grade NGL.

45. The method of claim 42, further comprising formulating computational algorithms for the equation of state and the Y-Grade NGL rheology for each Y-Grade NGL stimulation fluid.

46. The method of claim 42, further comprising customizing the Y-Grade NGL stimulation fluid by adding at least one of a mechanical diverting agent and a chemical diverting agent with the Y-Grade NGL stimulation fluid.

47. The method of claim 42, wherein the Y-Grade NGL stimulation fluid comprises an unfractionated hydrocarbon mixture comprising ethane, propane, butane, isobutane, and pentane plus, wherein the unfractionated hydrocarbon mixture is a byproduct of a condensed and de-methanized hydrocarbon stream, wherein the unfractionated hydrocarbon mixture is condensed out of the hydrocarbon stream at a temperature at or below 0 degrees Fahrenheit, wherein the unfractionated hydrocarbon mixture comprises ethane, propane, and butane in an amount of at least 75% by volume, and wherein the unfractionated hydrocarbon mixture comprises pentane plus in an amount less than 30% by volume.

* * * * *